United States Patent [19]

Cutton

[11] E Re. 28,719

[45] Reissued Feb. 24, 1976

[54] METHOD OF MAKING FLAT STEEL FILES

[75] Inventor: John G. Cutton, Youngstown, Ohio

[73] Assignee: United States Steel Corporation, Pittsburgh, Pa.

[22] Filed: Mar. 5, 1975

[21] Appl. No.: 555,485

Related U.S. Patent Documents

Reissue of:

[64] Patent No.: 3,820,372
Issued: June 28, 1974
Appl. No.: 211,091
Filed: Dec. 22, 1971

[52] U.S. Cl. ..... 72/203; 72/364; 72/365; 76/24 R; 148/12 B

[51] Int. Cl.[2] ..... B21B 3/02

[58] Field of Search ..... 72/364, 365, 203, 204; 76/24 R; 148/2, 12; 75/123

[56] References Cited

UNITED STATES PATENTS

| | | | |
|---|---|---|---|
| 1,896,199 | 2/1933 | Peiseler | 76/24 |
| 2,105,114 | 12/1948 | Gill | 148/12 |
| 3,416,347 | 12/1968 | Walsh et al. | 72/203 |
| 3,671,336 | 6/1972 | Korchynsky | 148/12 |

*Primary Examiner*—Lowell A. Larson
*Attorney, Agent, or Firm*—Forest C. Sexton

[57] ABSTRACT

A process for making flat steel files wherein a highcarbon steel is hot rolled on a wide strip mill and coiled. The coil is given a spheroidizing anneal and slit into bar and cut into flat bar stock. File blanks are cut from the flat bar stock and ground to remove a pure iron surface caused by the anneal. Thereafter, the file teeth or grooves are cut and the file hardened.

5 Claims, No Drawings

METHOD OF MAKING FLAT STEEL FILES

Matter enclosed in heavy brackets [ ] appears in the original patent but forms no part of this reissue specification; matter printed in italics indicates the additions made by reissue.

According to present commercial practices, steel files are manufactured from hot rolled, high carbon steel bars. The steel bars are hot rolled from billets on merchant bar mills into the final cross-sectional dimensions, usually less than 1 inch in area, and then cut into various lengths of bar stock. The file manufacturer then purchases such bar stock and produces files therefrom. Specifically, the bar stock is cut into file blanks of the desired shape, and then the file blanks are annealed so that they can be ground to remove mill scale and have the file teeth or grooves cut thereinto. Lastly, the files are hardened into useful files by a suitable heat treatment involving lead baths and brine quench tanks.

Because of the rather small sizes of steel rods involved, the above described hot rolling procedure is cumbersome and expensive, not only because of the excessive rolling passes needed to attain such small dimensions, but further because hot rolling such small bars results in a rather large number of mill rejections due to non-straightness, off width and out-of-square edges.

An object of this invention is to provide a new and improved process for making flat steel files, and more particularly to an improved hot rolling procedure for making the flat bar stock from which files are made. The process utilizes a wide strip which not only simplifies and reduces the hot rolling costs, but further simplifies and reduces the costs encountered by the file manufacturer.

Another object of this invention is to provide a new process for hot rolling high-carbon steel flat stock as used for the manufacture of flat steel files.

A further object of this invention is to provide a new process for manufacturing flat steel files.

Although there are many steel bar sizes and shapes used in the manufacture of steel files, such as triangles, rounds, flats, ovals, half ovals, etc., this invention is concerned only with the manufacture of flat steel files which are the substantial majority steel file product. As to flat steel files alone, there are of course many sizes produced requiring many sizes of hot rolled flat bar stock. The most common sizes are 6 inch Mill, 7 inch Mill, 8 inch Brittsaw and 6 inch Flat, which have cross-sectional dimensions of 0.620 by 0.116 inch, 0.715 by 0.134 inch, 0.950 by 0.115 inch and 0.620 by 0.155 inch respectively.

As in prior art practices, the process of this invention requires that a high-carbon steel, i.e., 1.05 to 1.50 percent C, having a suitable file chemistry, be hot rolled. A typical file chemistry would be 1.20–1.30 percent C, 0.30–0.40 percent Mn, 0.10–0.30 percent Si and 0.12 to 0.17 percent Cr. Contrary to prior art practices, however, in the practice of this invention the steel is not hot rolled into billets and then hot rolled into flat bar stock on a merchant mill, but rather the steel is first hot rolled into slabs and then hot rolled on a wide strip mill to 0.080 to 0.160 inch and coiled while hot. Hot rolling of the slab should be commenced at a sufficient temperature, usually about 2,100° F, so that rolling should be completed at a temperature about 1,600° F. Thereafter, the strip is coiled at a preferable temperature of 1,200°–1,300° F, but in no event should the strip be allowed to cool below 1,000° F prior to coiling. After coiling, the strip may be allowed to cool to ambient temperatures.

Because of the high carbon content, the cooled coil of hot rolled strip will be hard and brittle due to the pearlite microstructure containing carbides. In fact, the coil will be too brittle to open without cracking. Therefore, the strip is softened while coiled with a suitable spheroidizing anneal. Specifically, the coil is box annealed in a reducing atmosphere at a temperature just above the $A_1$ critical temperature, i.e., just above about 1,330° F, to austenitize the pearlite. Specifically, I prefer to anneal within the range 1,350° to 1,380° F for a period of at least 2 hours. Thereafter, the coil must be cooled slowly within the reducing atmosphere to a temperature well below the $A_1$ critical temperature to promote the precipitation of spheroidized carbides. Specifically, I first cool the coil at a rate of about 40° F per hour to the $A_1$ critical temperature of 1,330° F, and thereafter cool at a rate of about 20° F per hour through the critical temperature to about 1,250° F during which time the spheroidized carbides will precipitate. After the carbides are precipitated, the cooling rate is of no great concern, but the coil should be retained in the reducing atmosphere for as long as necessary to prevent surface oxidation, i.e., to below 400° F.

Control of the furnace atmosphere during the above anneal is essential to derive a useful product. First, the annealing atmosphere must be reducing in nature in order to eliminate the mill scale formed at hot rolling. That is, the mill scale, being primarily oxides of iron, will be reduced to a metallic iron film on the strip surface by the reducing atmosphere. In addition, it is of course essential that the carbon content of the steel be retained and, therefore, decarburizing conditions during the anneal must be avoided. To this end, therefore, the annealing step should be effected as fast as possible to minimize decarburization and yet achieve a well spheroidized structure. More important, however, it is essential that the annealing atmsophere have a dewpoint of less than +15° F in order to minimize decarburization. Because of the presence of the mill scale, however, the dewpoint of less than +15° F may be difficult to maintain because the mill scale reduced with hydrogen produces water. To eliminate this problem, I start the anneal without any dewpoint adjustments, heating the coil in a reducing atmosphere until a temperature of 1,100° F is reached. By the time 1,100° F is reached, all of the mill scale will be reduced to iron, while only a very slight surface decarburization will be effected, on the order of 0.001 to 0.002 inch at most. At this temperature of 1,100° F, I adjust the dewpoint to a value below +15° F, and then continue to heat the coil. Since the surface mill scale is completely reduced at 1,100° F, no further dewpoint adjustments will be necessary. It is further desirable that the strip be as free from water, rust, oil, etc. as possible so that the dewpoint can be achieved as quickly as possible.

After the steel strip is given the spheroidizing anneal as described above and cooled, the strip is uncoiled and slit into the desired widths, and cut into lengths of flat bar stock. Prior to slitting, the strip may be given a light roll to eliminate coil set, if so desired.

It will be noted that the process of this invention actually requires more steps to produce the cut lengths of flat bar stock than does the prior art process. Specifically, this process requires coiling, annealing and slitting steps not practiced by the prior art. These extra steps do of course mean added expense in producing the flat stock. On the other hand the use of a conventional wide strip mill for hot rolling as compared to hot rolling the individual small bars on a merchant mill does provide a very substantial savings, far more than sufficient to offset the expenses of the added steps. Hence the steel mill can supply annealed cut lengths of flat bar stock to a file manufacturer at a substantially lower cost than the unannealed flat bar stock produced by the prior art method.

The cost saving does not however stop at the steel mill since the file manufacturer's procedures would be simplified by buying a steel which is already annealed. Upon receipt of the annealed cut lengths of flat bar stock, the file manufacturer cuts the bar stock into suitable file blanks as he did before. Contary to prior art practices, however, he need not anneal the file blanks but proceeds directly to surface grind the file blanks. In prior art practices such grinding was necessary to remove the mill scale caused by hot rolling. In this process on the other hand, such surface grinding is necessary to remove the thin outer layer of pure iron formed during the spheroidizing anneal and the thin outer decarburized layer of steel. After the file blanks have been ground to expose the high carbon subsurface metal, the file grooves or teeth are cut and the metal rehardened according to prior art practices, i.e., the individual files are immersed into a molten lead bath at 1,450° F and held for about 3 or 4 minutes, and then quenched in a saturated brine solution until cold.

As noted above, the process of this invention would be particularly attractive to the file manufacturer because of the many forms of saving it would offer. In the first place, the steel bars themselves would be cheaper because of the cost saving in hot rolling on a wide strip mill as opposed to a merchant mill and, as previously noted, the file manufacturer would be able to eliminate the costly step of annealing the bars prior to grinding and cutting the teeth or grooves. Besides the two above obvious savings, this invention process would provide the file manufacturer with a greater opportunity to vary his practices in order to realize even more savings. For example, the file manufacturer could, if he wishes, purchase his steel in coil form and do his own annealing and/or slitting. That is to say, because of the complexities and extensive equipment necessary for hot rolling small bar sizes on merchant bar mills according to prior art practices, the hot rolled steel could only be made available in cut lengths of flat bar stock. In the practice of this invention, however, file steels could be shipped from the mill in coil form, annealed or unannealed. This would not only simplify handling of the steel stock, but by buying in coil form, the manufacturer would not have to stock a large variety of bar sizes. Specifically, file blanks of any desired width and length could be slit or cut from a single coil. In addition, the availability of annealed steel may even permit the file manufacturer to produce file shapes other than flat. For example, half round or half oval files could be produced from the annealed flat steel stock by a suitable cold forging procedure.

In order to illustrate the subject invention by way of example, a trial order was prepared and processed according to the above invention. Specifically, an open hearth heat of steel was made having the following ladle chemistry:

| | |
|---|---|
| Carbon | 1.33% |
| Manganese | 0.29% |
| Phosphorus | 0.011% |
| Sulfur | 0.34% |
| Silicon | 0.19% |
| Nickel | 0.01% |
| Chromium | 0.14% |

Ingots were cut therefrom and subsequently rolled into four slabs 16¼ by 5¾ inches. The slabs were heated to 2,100° F and hot rolled on a 43 inch hot strip mill to 17 inches by 0.116 inch and coiled. Hot rolling finishing temperature was 1,630° F and the strips were coiled at 1,240° F. Upon cooling, the strip coils exhibited a pearlitic microstructure containing carbides having a Rockwell C hardness of 26–27. Subsequently, the coils were heated to 1,100° F in a reducing atmosphere and the atmosphere then adjusted to a dewpoint of less than +15° F and then the coils annealed for 8 hours at 1,365° F. After annealing the coils were cooled at a rate of 40° F per hour to 1,330 and then cooled at 20° F per hour to 1,250. From 1,250 to 400° F, the coil was furnace cooled in the protective atmsophere, and below 400° F the coil was air cooled. Examination of the annealed microstructure revealed that 100 percent of the carbides had been spheroidized, and that there was descarburization to a depth of 0.002 to 0.003 inch. The coils were slit at 200° F on a commerical slitting line without difficulty, and cut to lengths of 72 inches. The cut bar exhibited a Rockwell B hardness of 85–87.

The bars produced as described above were shipped to a file manufacturer who proceeded to produce files thereform in accordance with the above described procedure. That is, file blanks were cut therefrom, the surfaces ground to remove the iron down to the high carbon subsurface, grooves cut therein and finally hardened by a suitable lead heating and brine quenching. The file manufacturer reported that the files were most satisfactory.

I claim:

1. A method of making high-carbon steel flat bar stock, the steps comprising:

a. hot rolling a high-carbon steel slab at a temperature within the range 1,600° to 2,200 °F on a strip mill to form a strip having a thickness as desired for the final flat bar stock, b. coiling said strip at a temperature above 1,000°F, c. annealing said coiled strip in a reducing atmosphere at a temperature above the $A_1$ critical temperature for at least 2 hours to austenitize the steel microstructure, d. maintaining the reducing annealing atmosphere at a dewpoint of less than +15°F at least at temperatures above about 1,100°F, e. furnace cooling the annealed coiled strip at a rate of about 20° to 40°F per hour to a temperature of about 1,250°F while maintaining the reducing atmosphere at a dewpoint of less than +15°F to form spheroidized carbide precipitates, and then furnace cooling the coiled strip to a temperature below about 400°F while maintaining the reducing atmosphere to avoid surface oxidation, and f. uncoiling [ and slitting ] the strip [ into bars of the desired width ] *and cutting bars of the desired size therefrom.*

2. The method of claim 1 in which strip is hot rolled to a thickness of 0.080 to 0.160 inch.

3. The method of claim 1 in which said coiled strip is annealed at a temperature within the range 1,350° to 1,380°F.

4. The method of claim 1 in which said coiled strip is box annealed by heating the coiled strip in a reducing atmosphere to a temperature of about 1,100°F and then adjusting the dewpoint of the reducing atmosphere to less than +15°F and thereafter continue heating to a temperature within the range 1,350° to 1,380°F and maintaining said temperature for about 5 hours, thereafter furnace cooling said coiled strip at a rate of about 40°F per hour to a temperature of about 1,330°F, and then at a rate of about 20°F per hour to a temperature of about 1,250°F.

5. A method of making steel files, the steps comprising:

a. hot rolling a high-carbon steel slab at a temperature within the range 1,600° to 2,200°F on a strip mill to form a strip having a thickness as desired for the final flat bar stock.

b. coiling said strip at a temperature above 1,000°F.

c. annealing said coiled strip in a reducing atmosphere at a temperature above the $A_1$ critical temperature for at least 2 hours to austenitize the steel microstructure, d. maintaining the reducing annealing atmosphere at a dewpoint of less than +15°F at least at temperatures above about 1,100°F, e. furnace cooling the annealed coiled strip at a rate of about 20° to 40°F per hour to a temperature of about 1,250°F while maintaining the reducing atmosphere at a dewpoint of less than +15°F to form spheroidized carbide precipitates, and then furnace cooling the coiled strip to a temperature below about 400°F while maintaining the reducing atmosphere to avoid surface oxidation, f. uncoiling and slitting the strip into bars of the desired width, g. cutting the bars to the desired length, and cutting the bar lengths into file blanks, h. grinding the surface of the file blanks to remove a pure iron surface layer caused by the anneal and expose a high-carbon subsurface, i. cutting file grooves into the file blanks, and j. hardening the file blanks.

* * * * *